United States Patent [19]

Elmaleh et al.

[11] Patent Number: 4,954,259
[45] Date of Patent: * Sep. 4, 1990

[54] PROCESS FOR THE TREATMENT AND PURIFICATION OF WATER BY THE FLOCCULATION OF SUSPENDED PARTICLES IN A FLUIDIZED BED

[75] Inventors: Samuel Elmaleh, Castelnau le Lez; Alain Grasmick, Montferrier/Lez, both of France

[73] Assignee: Mornex Limited, London, England

[ * ] Notice: The portion of the term of this patent subsequent to May 7, 2002 has been disclaimed.

[21] Appl. No.: 148,498

[22] Filed: Jan. 26, 1988

Related U.S. Application Data

[63] Continuation of Ser. No. 735,862, May 20, 1985, Pat. No. 4,743,376.

[30] Foreign Application Priority Data

May 23, 1984 [FR]   France ............................ 84 08026
Nov. 16, 1984 [FR]   France ............................ 84 17539

[51] Int. Cl.$^5$ ............................................. C02F 1/54
[52] U.S. Cl. ................................... 210/617; 210/713; 210/715; 210/730
[58] Field of Search ................ 210/617, 661, 713–715, 210/730, 807

[56] References Cited

U.S. PATENT DOCUMENTS

| | | | |
|---|---|---|---|
| 3,232,434 | 2/1966 | Albersmeyer | 210/617 |
| 3,320,136 | 5/1967 | Zajic | 210/730 |
| 3,406,114 | 10/1968 | Goren | 210/730 |
| 3,658,697 | 4/1972 | Huether | 210/617 |
| 3,728,253 | 4/1973 | Kaufman | 210/715 |
| 3,763,039 | 10/1973 | Wilson | 210/730 |
| 4,115,266 | 9/1978 | Ohshima | 210/807 |
| 4,505,819 | 3/1985 | Barnes et al. | 210/617 |
| 4,515,697 | 5/1985 | Elmaleh et al. | 210/807 |
| 4,719,020 | 1/1988 | Elmaleh | 210/795 |
| 4,743,376 | 5/1988 | Elmaleh et al. | 210/617 |

FOREIGN PATENT DOCUMENTS

| | | |
|---|---|---|
| 0085629 | 10/1983 | European Pat. Off. . |
| 3332214 | 3/1984 | Fed. Rep. of Germany . |
| 287573 | 4/1953 | Switzerland . |
| 1200364 | 7/1970 | United Kingdom ................ 210/715 |

*Primary Examiner*—Peter Hruskoci
*Attorney, Agent, or Firm*—Lackenbach Siegel Marzullo & Aronson

[57] ABSTRACT

The invention involves a process for the flocculation of matter suspended in water. According to the invention, the water is passed through a granular medium in a fluidized bed, without prior saturation of the granular medium in a fixed bed, and flocculated aggregates are collected downstream and subjected to settling or some other liquid/solid separation procedure, in order to obtain an effluent which is partially freed of its pollution.

16 Claims, 2 Drawing Sheets

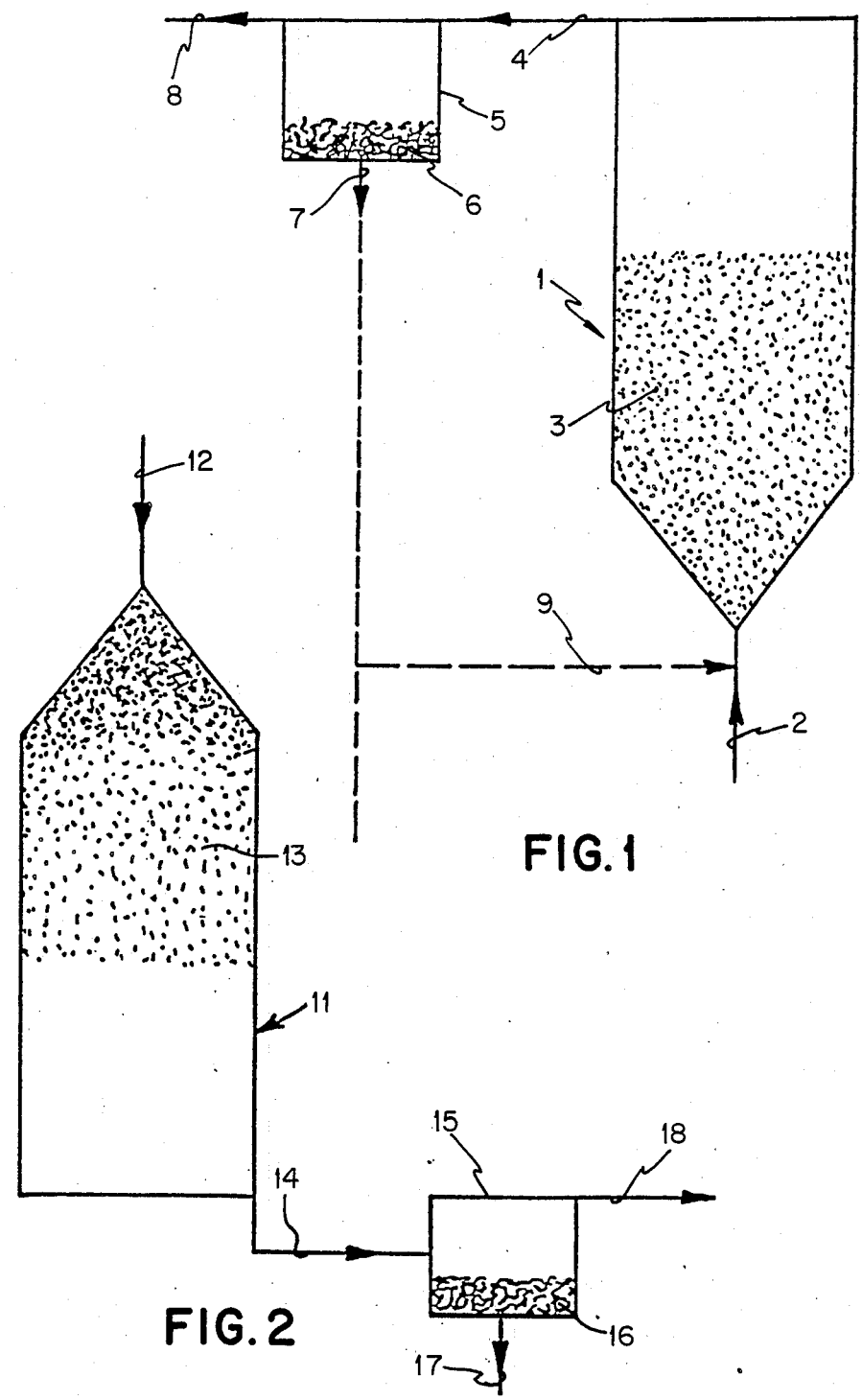

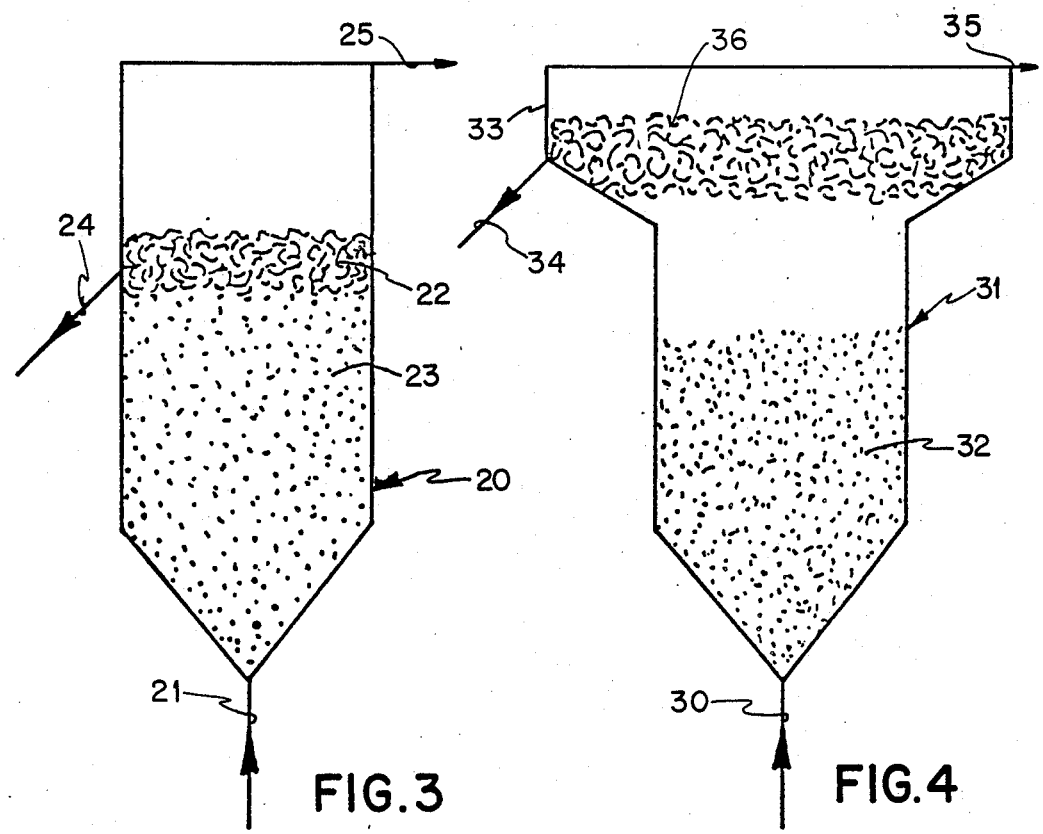
FIG. 3
FIG. 4
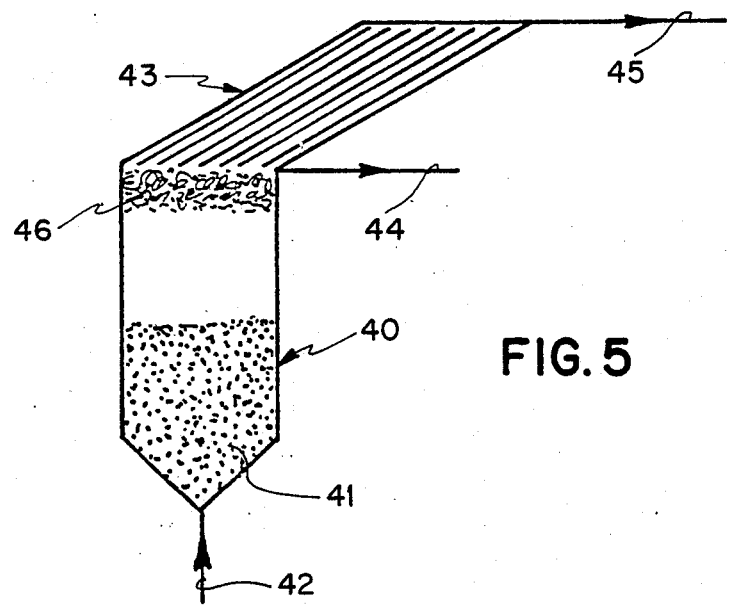
FIG. 5

PROCESS FOR THE TREATMENT AND PURIFICATION OF WATER BY THE FLOCCULATION OF SUSPENDED PARTICLES IN A FLUIDIZED BED

This is a continuation, of application Ser. No. 735,862, filed May 20, 1985, now U.S. Pat. No. 4,743,376.

The present invention involves a process for the treatment and purification of water by the flocculation in fluidized beds of suspended particles. More particularly, the invention concerns a process of this type which in some cases (suspensions of organic matter) can be used without the addition of chemical reagents to give results similar to those obtained by the usual physico-chemical processes.

Urban waste water, for example, is known to contain about 200–300 mg/l of suspended matter and has a total biologic oxygen demand ($BOD_5$, the 5-day biologic oxygen demand) of about 200–400 mg/l, 100 to 200 mg/l of which is the dissolved $BOD_5$. The polluting matter which such water contains can be roughly categorized as solid pollutants (about one-third) colloidal pollutants (another third) and dissolved pollutants (the final third).

The usual pathways of water purification involve the use of biologic or physico-chemical processes.

Although biologic processes do provide considerable reduction in the level of pollution, they respond poorly to variations in the level of pollution of the water under treatment or to the inflow of toxic pollutants, such as may occur if the water-treatment plant receives industrial effluents.

About 10 or 20 years ago, great interest was aroused by physico-chemical processes and, in particular those processes in which a liquid/solid separator was installed upstream of the flocculator. This was, for instance the case in the clariflocculation processes which combined a flocculator and a settler.

The advantage of units of this type is that they make it possible to treat a wide range of pollution inflow, such as for example plants serving holiday-resorts with very varied population. Such processes provide 70% to 90% reduction of the pollution influx and the residual pollution can, if neccessary, be subject to further treatment.

The main drawbacks to systems of this type result from the need to use large amounts of expensive reagents, which implies the production of large amounts of sludge with mediocre mineralization.

It has also been suggested (European Patent application (published as n° 0 085 629) that processes could be used in which the liquid containing the suspended matter is passed through a granular medium in a fixed bed until the medium is saturated (either partially or totally). The medium in the fixed bed is then at least partially de-clogged and the liquid containing the suspended particles passed through-it once more, either with or without chemical reagents, the effect being the formation of flocculated aggregates. The drawback of processes of this type is, however, that they do require an initial saturation of the granular medium.

The purpose of the present invention is to provide a water-purification method which involves the passage of the water being treated through a fluidized granular medium without any preliminary saturation of this medium in a fixed bed and, for some applications, without the addition of chemical flocculation reagents.

The phenomenon by which particles suspended in a liquid are flocculated is connected with two main parameters;

(a) the repulsive-attractive forces between particles, which may be modified by the addition of appropriate reagents;

(b) the velocity gradient, or hydraulic gradient G, which is defined by the following equation:

$$G = \sqrt{\frac{P}{\mu V}}$$

where:
P is the power used in the system,
$\mu$ is the dynamic viscosity of the liquid phase and
V the volume of the liquid phase.

In order to set up a viscosity gradient, most floculators use stirring energy.

The inventors have however demonstrated that granular media can be used in floculation processes and the energy degraded corresponding to the pressure drop.

A fluidized bed of granular material can be used with advantage for this purpose.

firstly, the fall in pressure is constant throughout the fluidization field;

secondly, it can be shown that the ratio $G/G^\circ$ of the velocity gradient to the velocity gradient in the prefluidized state varies little in function of the number of fluidizations (the ratio of superficial velocity to incipient fluidization superficial velocity);

finally, the ratio $Gt/G^\circ t^\circ$ of the number of CAMP Gt in the state under study to the number of CAMP $G^\circ t^\circ$ in the prefluidized state also varies little.

This means that by calculating a flocculator in a fluidized bed at the incipient fluidization, the actual yield of the flocculator can easily be transposed to the fluidization field.

Furthermore, it is of interest to note that at the fluidization minimum, $G^\circ$ is proportional to the apparent density of the material making up the bed and to the mean diameter of the granules. Similarly, $G^\circ t^\circ$ is proportional to the ratio $H^\circ/d$ of the height, $H^\circ$, of the fixed bed to the mean diameter, d of the granules and is independent of the density of the material used.

The present invention is based on the above-described properties of fluidized beds as a means of production of a hydraulic gradient and on the self-flocculating property of waste water in the systems which are described below.

Consequently, the present invention concerns a process for the separation of suspended matter in water which is characterised by the fact that this water is passed through a granular medium in a fluidized bed, without prior saturation of the granular medium in a fixed bed, that the flocculated aggregates are collected downstream from the aforesaid bed, and that they are then subjected to a liquid/solid separation process, such as settling, in order to obtain an effluent which is partially purified of the initial pollution and aggregates of flocculated particles.

The flocculation phenomenon which occurs in the fluidized bed traps some of the dissolved polluting matter, just as in the usual clariflocculation process a partially purified effluent is obtained.

In the fluidized bed, the granular medium may undergo expansion of the order of 30 to 200 percent.

In order to obtain a fluidized bed, any packing material may be used, such as sand, and this may have low particle-size, of the order of 50 μm to 1 cm.

This granular material may be heavier or lighter than water, since the passage of liquid through the granular medium occurs as an upward flow if the material chosen is heavier than water and as a downward flow if it is lighter than water. The specific gravity of this material should be of the order of 0.8 to 3 g/cm$^3$.

The apparent space-time of the water under treatment should be of the order of 3 to 10 minutes, with a velocity of between 0.01 to 200 m/h.

The fluidization number (ratio of the superficial velocity of the treated liquid to the minimum fluidization velocity of the granular material) should be of the order of 1.1 to 15.

In cases in which the suspended particles take the form of an unstable colloid, the process according to the invention can be employed without the addition of, flocculating agents —in which case, self-flocculation of the suspended material occurs—or with the addition of a flocculating agent. In cases in which the suspended particles are not auto-flocculant, the addition of a flocculating agent to the treated medium will usually be necessary.

In both cases, and in a totally unexpected fashion, the inventors have demonstrated that in order to promote flocculation of these suspended particles, it is helpful to add to the suspension to be purified either before the flocculation treatment or during this treatment, secondary sludges from the treatment of waste water. When the treatment medium itself consists of waste water, it suffices to recycle some of the separated aggregates into the inflow of the circuit containing the granular medium in the fluidized bed.

Without engaging the patentability of the invention by this hypothesis, the work of the inventors has demonstrated that the bacteria of the banal microflora of waste water secrete polysaccharides which are able to form a mucilage which serves not only to bind bacterial cells, but also to bind the microscopic particles of the suspension.

BRIEF DESCRIPTION OF THE DRAWINGS

The simplified diagrams which are appended illustrate various methods of operating the invention. These diagrams, which are, of course, in no way exhaustive, show the following features:

FIG. 1 shows a treatment system for waste water, in which the waste water circulates in an upward flow through a reactor with a fluidized bed consisting of particles of a material with a specific gravity greater than 1;

FIG. 2 shows an analogous system, in which the waste water circulates in a downward flow through a reactor in which the particles of the fluidized bed have a specific gravity of less than 1;

FIGS. 3 to 5 are diagrams showing other systems utilizing the invention.

The system shown in FIG. 1 involves a reactor, 1, which is fed with water for treatment through a pipeline, 2, at its base, and which contains a fluidized bed, 3, consisting of particles of a material with a specific gravity greater than that of water.

The treated water containing the particle aggregates formed as a result of the passage of the waste water through the fluidized bed, 3, is evacuated via the pipeline, 4, at the top of the reactor,1, to a settling tank,5, from the floor of which the sludges, 6, are evacuated via pipeline 7 whereas the purified water is collected from the upper part of this tank via pipeline 8.

As was described earlier, in cases in which the particles suspended in the treated water are of organic origin, as is the case when sewage water is to be treated, the process according to the invention can be operated without the addition of the usual flocculating agents, although these may be used to accelerate the flocculation process. If the suspended particles are inorganic, flocculating agents will be required and in either case a suitable flocculating agent would be constituted by waste sludge from secondary waste water treatment. If the sewage water is to be treated some of the waste sludge settled in the sedimentation 5 could be recycled through reactor 1 via pipeline 9 and pipeline 7.

In FIG. 2, the reactor, 11, is fed by sewage water by pipeline 12 which is at the top of the reactor,1; the reactor contains a fluidized bed, 13, consisting of particles of a material with a specific gravity of less than 1.

The treated water containing the aggregates of particles formed by passage through the fluidized bed is collected at the base of the reactor,13, by a duct, 14, and evacuated into a settling tank, 15, at the base of which sludges, 16, are collected by a pipeline, 17, and from the top of which purified water is collected by a pipeline 18.

FIG. 3 illustrates the application of the process according to the invention in cases in which the velocity of the liquid to be treated and brought to the base of the reactor, 20, via a pipeline, 21, is less than the decantation velocity of the aggregates, 22, formed. These aggregates are held in suspension at the top of the fluidized bed, 23, whence they can be evacuated horizontally from the reactor via a pipeline, 24, and the partially purified water is evacuated also from the upper part of the reactor via pipeline 25.

A similar solution may be adopted even in cases in which the velocity of the liquid for treatment, which is brought in via pipeline 30 to the base of the reactor,31, which contains the fluidized bed, 32, (see FIG. 4) is greater than the decantation velocity of the aggregates, 36, formed. All that is needed is the provision of a tank, 33, at the top of the reactor, 31, which has a cross-section greater than that of the base of the reactor and sufficiently great for the velocity of the partially purified water which flows through it to be less than the decantation velocity of the aggregates, 36. The aggregates are held in suspension at the base of the tank, 33, from which position they can be evacuated via pipeline 34, whilst the partially purified water is evacuated from the the top of the tank via pipeline 35.

FIG. 5 shows another method of operating the invention, in which the reactor, 40, containing the fluidized bed, 41, is fed at a velocity exceeding the decantation velocity of the aggregates formed, 46. In this case, the reactor, 40, is fitted with a multitubular decantor, 43, at its top.

The aggregates are deposited in the lower regions of the inclined tubes of this settler, ie at the top of the reactor, 40, whence they are evacuated via pipeline 44 and the purified liquid is evacuated via pipeline 45 from the upper part of the settler,43.

These various operating methods for the invention are not, of course, exhaustive.

The Examples which follow demonstrate the advantages of the invention.

EXAMPLE 1

This Example illustrates the auto-flocculation of particles suspended in waste water, without the addition of reagents, using the process of the invention.

Waste water, with a total $BOD_5$ of 200 mg/l and containing 200 mg/l of suspended matter, is upflowed through a column with a diameter of 20 cm and packed with sand having a density of 1.7 g/cm$^3$ and with a mean particle size of 270 μm. The height of the fixed granular bed is 1.40 m.

The sand bed expands by 50% and the upper space-time is 7 minutes, the velocity being 10 m/h. The treated water, containing aggregates of suspended matter is then transferred to a settling tank, where the sludges obtained after a flow-time of 7 minutes have a concentration of 5 g/L. After settling for 30 minutes, the sludges have a concentration of 15 g/l.

After passage through the settling tank, the $BOD_5$ of the treated water is reduced by 90% and the suspended matter reduced by 70 to 85%, varying from one test to another.

EXAMPLE 2

This Example also demonstrates auto-flocculation of particles in suspension obtained by means of the process according to the invention. A cylindrical column, with a diameter of 10 cm and a length of 2.1m is used. This column is packed to a height of 1.1 m with builders' sand, sieved to pass particles 200 to 400 μm in diameter, with a mean diameter of 350 μm. The density of this sand is 2.7 g/cm$^3$ and the minimum fluidization velocity 4.23 m/h.

The effluent obtained after treatment of water for purification in this column requires clarification; the determinations are therefore carried out using clarified water after standard decantation in a test tube for 15 minutes.

The system is fed with gridded waste water with the following mean characteristics:
 suspended solids: 150 mg/l
 total organic carbon: 67 mg/l
 temperature: 18° C.

This water is treated in the column without the addition of any coagulant and at various circulating velocities.

The results obtained are shown in Table I (below).

| Superficial velocity of water (m/h) | Expansion of granular bed (%) | Suspended solids removal efficiency (%) | Total organic carbon abatement efficiency (%) |
| --- | --- | --- | --- |
| 17.3 | 40 | 45 | 38 |
| 20.3 | 50 | 52 | 47 |
| 30 | 70 | 64 | 50 |
| 50.8 | 90 | 80 | 60 |

The effluent is very readily clarified and on average the sludge volume index is 35 cm$^3$/g. After decanting for 15 minutes in a test-tube, the sludge obtained presents concentrations of solids of over 10 g/l.

EXAMPLE 3

This Example demonstrates the operation of the process according to the invention with the addition of reagents. The system used is the same as that described above with the injection of ferric chloride, $FeCl_3$ to the influent.

The water fed into the system is the same as that described in the previous Example. Tests are carried out using various concentrations of $FeCl_3$.

All tests are carried out with a sand-bed expansion of 50% ie a velocity of 20.3 m/h.

The results obtained are shown in Table II below.

TABLE II

| $FeCl_3$ concentration (mg/l) | Suspended solids removal efficiency (%) | Total organic carbon abatement efficiency (%) |
| --- | --- | --- |
| 0 | 52 | 47 |
| 50 | 58 | 53 |
| 100 | 77 | 66 |
| 150 | >80 | 73 |
| 250 | >80 | 73 |
| 350 | >80 | 73 |

These results show that the addition of a reagent increases the purification efficiency to a given required level.

EXAMPLE 4

This Example concerns the effects of the addition of waste sludges, from waste-water treatment to liquids undergoing treatment by the process according to the invention.

Two series of tests were run:
 the usual "jar test": the jar-test unit used being that of the Water Research Centre model;
 a fluidized bed flocculator in compliance with the invention. The specifications of this Flocculator are as follows: a cylindrical column 3 cm in diameter and packed with sand, particle size 165 μm and density 2.7 g/cm$^3$. Determinations were carried out using the supernatant after 15 minutes decantation in a test-tube.

The system was fed with a suspension of bentonite with no self-flocculating propensity. This suspension was treated with ferric chloride, the usual coagulant, which was used as a reference substance. The flocculation obtained was compared with that obtained using thickened sludges obtained from an activated-sludge urban water-treatment station (secondary thickened sludges-STS).

1. Jar tests concentration of bentonite 150 mg/l
velocity gradient 60 s$^{-1}$ The tests were carried out using varying amounts of reagent. The results are presented in Table III (below).

| Reagent | Concentration of reagent added (mg/l) | Turbidity elimination efficiency (%) |
| --- | --- | --- |
| No reagent | 0 | 40 |
| $FeCl_3$ | 60 | 85 |
| STS | 60 | 95 |
| $FeCl_3$ | 120 | 92 |
| STS | 120 | 95 |
| $FeCl_3$ | 200 | 92 |
| STS | 200 | 90 |

These results demonstrate that secondary sludges can be used as the flocculating agent with efficiency similar to, if not better than, those obtained with a chemical coagulant.

2. Fluidized bed tests

Only secondary sludges (STS) were used. The system operated at a fluidization number of 8.35, which is equivalent to 70% expansion and an upflow superficial velocity of 9.4 m/h. The inflow concentration of bentonite was 150 mg/l.

The tests were carried out using various concentrations of STS. The results obtained are presented in Table IV below.

| STS Concentration (mg/l) | Suspended solids elimination efficiency % |
| --- | --- |
| 0 | 30 |
| 50 | 77 |
| 100 | 80 |
| 150 | 90 |
| 200 | 85 |

These examples demonstrate the high efficiency of the process according to the invention.

We claim:

1. A process for separating particles selected from the group consisting of organic particles, inorganic particles, and mixtures thereof of suspended matter from water comprising the steps of:
    (a) providing in said water sufficient bacteria to secrete an effective amount of flocculating agent, and passing the water through unsaturated granular material as a fluidized bed to flocculate into aggregates said bacteria and said particles in said fluidized bed,
    (b) collecting the flocculated aggregates downstream from the fluidized bed, and
    (c) subjecting the water to a suitable liquid/solid separation technique,
whereby separately a liquid effluent and solid aggregates of the flocculated particles are produced wherein the ratio of the velocity of said effluent to the minimum velocity of the granular material is between 1.1 to 15, the particle-size of the granular material is between about 50 $\mu$m and 1 cm, and the density of the granular material is between 0.8 and 3 g/cm$^3$.

2. Process, according to claim 1, wherein the granular material used in the fluidized bed undergoes expansion from 30 to 200 percent.

3. Process according to claim 1, wherein the upflow superficial velocity of the water under treatment is between 0.01 and 200 m/h.

4. Process according to claim 1, wherein the height of the granular material of the fluidized bed is between 10 cm and 5 m.

5. Process according to claim 1, wherein the granular material of the fluidized bed has a specific gravity of over 1 and that the water under treatment flows upwards through the fluidized bed.

6. Process according to claim 1, wherein the granular material of the fluidized bed has a specific gravity of less than 1 and that the water under treatment flows downwards through the fluidized bed.

7. Process according to claim 1, wherein the water to be treated passes through the fluidized bed without the addition of any flocculating agent.

8. Process according to claim 1, wherein the water crossing the fluidized bed does contain an added flocculation agent.

9. Process according to claim 8, wherein the said flocculating agent consists of secondary sludge from waste water treatment.

10. Process according to claim 9, applied to purification of sewage waste water and wherein some of the sludge separated from this waste water is recycled by feeding back through the granular medium in the fluidized bed to serve as a flocculating agent.

11. The process according to claim 1, wherein the particles are microscopic particles.

12. The process according to claim 1, wherein the bacteria secrete a polysaccharide flocculating agent.

13. The process according to claim 1, wherein a flocculating agent is not added to the water, whereby the suspended matter is auto-flocculating.

14. The process according to claim 1, wherein a flocculating agent is added to the water.

15. The process according to claim 14, wherein the flocculating agent is added to the water either before the flocculation treatment or during the flocculation treatment.

16. The process according to claim 1, wherein the flocculating agent is derived from a secondary sludge from the treatment of waste water.

* * * * *